United States Patent

Jonnes et al.

[15] 3,660,849
[45] May 9, 1972

[54] DEEP SUBMERGENCE DIVING SUIT AND INSULATIVE MATERIAL THEREFOR

[72] Inventors: Nelson Jonnes, Stillwater, Minn.; William S. Friedlander, Hudson, Wis.

[73] Assignee: Minnesota Mining and Manufacturing Company, St. Paul, Minn.

[22] Filed: July 13, 1970

[21] Appl. No.: 54,163

Related U.S. Application Data

[63] Continuation-in-part of Ser. No. 701,421, Jan. 29, 1968, abandoned.

[52] U.S. Cl. .................................. 2/2.1, 161/159, 161/161, 161/162, 161/190, 161/255, 260/2.5 B
[51] Int. Cl. ..................... B32b 3/26, B63c 11/04, B32b 5/16
[58] Field of Search .................. 161/87, 88, 159, 162, 168, 161/160, 161, 190, 255; 2/2.1 R; 260/2.5 B

[56] References Cited

UNITED STATES PATENTS

| | | | |
|---|---|---|---|
| 3,404,406 | 10/1968 | Balliet | 2/2.1 |
| 3,337,876 | 8/1967 | Armstrong | 2/2.1 |
| 3,265,765 | 8/1966 | Holden et al. | 260/41.5 |
| 2,478,126 | 8/1949 | Ostby | 2/2.1 |
| 2,981,954 | 5/1961 | Garbellano | 2/2.1 |
| 3,230,184 | 1/1966 | Alford | 260/2.5 |
| 3,307,540 | 3/1967 | Link | 2/2.1 |
| 3,365,315 | 1/1968 | Beck et al. | 260/37 |
| 3,521,628 | 7/1970 | Piel | 2/2.1 |

*Primary Examiner*—John T. Goolkasian
*Assistant Examiner*—George W. Moxon, II
*Attorney*—Kinney, Alexander, Sell, Steldt & Delahunt

[57] ABSTRACT

Deep submergence diving suit which maintains its low thermal conductivity at great depths and provides constant buoyancy at changing depths, having a layer of thixotropic material such as a grease or very low modulus elastomeric material filled with hollow glass microbubbles as an insulating layer, the preferred construction being based on a gel of block copolymer and mineral oil as the low modulus matrix.

20 Claims, 3 Drawing Figures

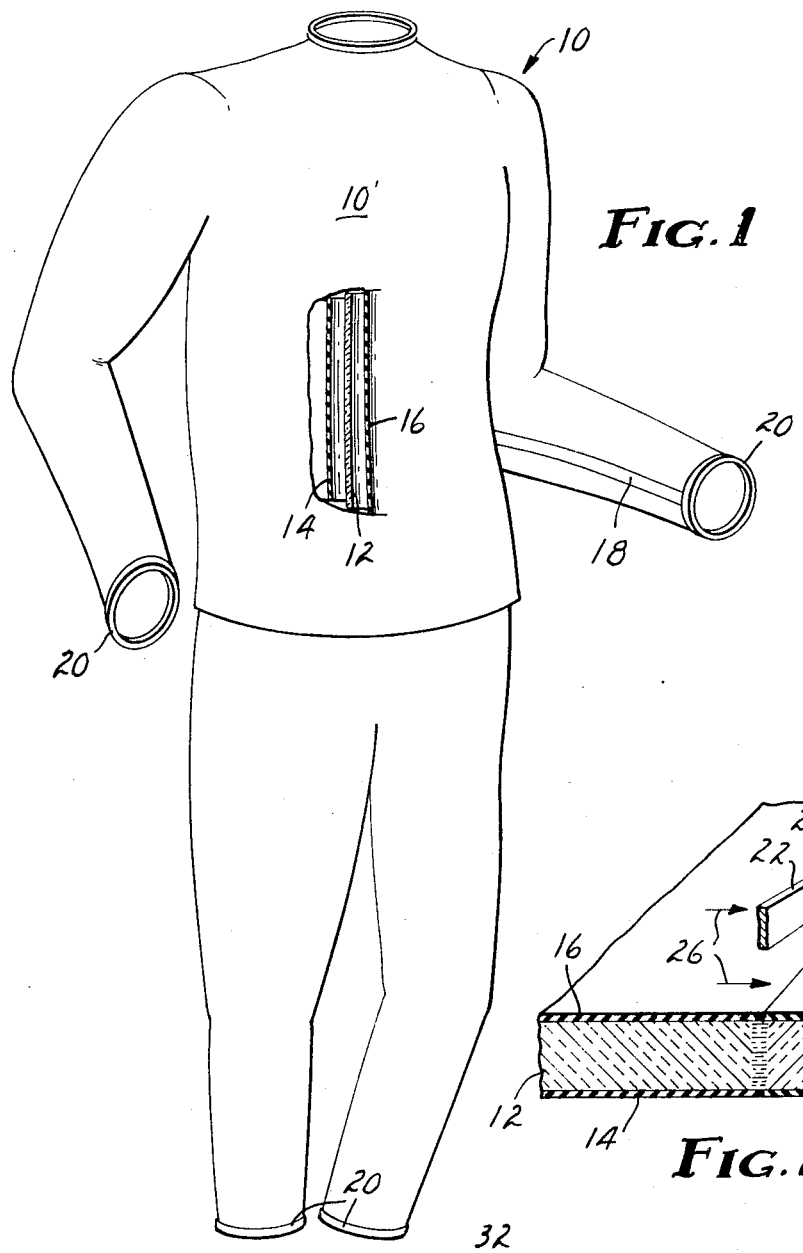
PATENTED MAY 9 1972
3,660,849
FIG.1
FIG.2
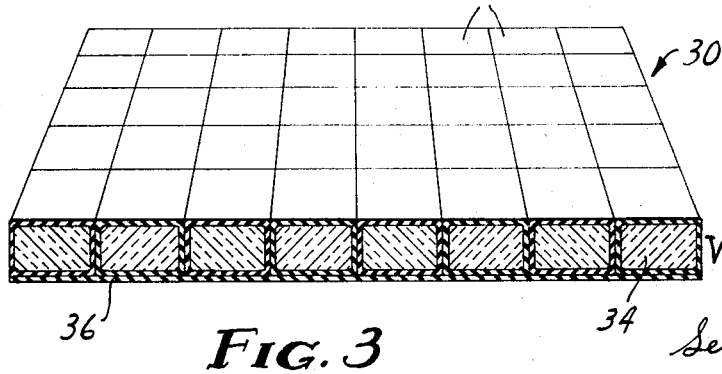
FIG.3
INVENTORS
NELSON JONNES
WILLIAM S. FRIEDLANDER
BY Kinney, Alexander,
Sell, Steldt & DeLaHunt
ATTORNEYS

DEEP SUBMERGENCE DIVING SUIT AND INSULATIVE MATERIAL THEREFOR

This case is a continuation-in-part of copending U. S. application Ser. No. 701,421, filed Jan. 29, 1968, now abandoned.

This invention relates to incompressible, flexible insulating material and to deep sea wet diving suits constructed therefrom having good thermal insulation at great depths. More particularly the invention relates to insulating materials and diving suits utilizing insulation based on a matrix of a soft thixotropic material or low modulus elastomeric material containing hollow glass microbubbles.

A major problem which has persisted in the deep sea diving art for many years has been that of providing adequate means for keeping divers warm at great depths. The neoprene foam wet suit, which has been a standard among ameteurs as well as professional divers, is excellent for diving near the surface. Such suits provide sufficient insulation to permit 2 to 3 hour immersion in freezing sea water at 28° F. (−2° C.). Without adequate insulation the heat loss to a diver in water at such temperatures is such as to cause unconsciousness within 15 minutes. When conventional foam suits are subjected to high hydrostatic pressures such as encountered in deep sea diving, the foam cells collapse, causing a reduction in both the thickness and thermal insulation of the suit. For example, conventional neoprene foam suits lose about 90 percent of their buoyancy when submerged to a depth of 100 ft. (30 meters) in the ocean, while the thermal conductivity of the suit increases by a factor of five or more. This buoyancy loss is readily detectable at depths as shallow as 30 ft., and represents a problem to divers because the buoyancy is reduced as depth is increased. This buoyancy change causes difficulty in maintaining depth.

Various solutions to this problem have been proposed, including battery powered electrical heaters. The use of such heaters is severely limited by short lived batteries or the possibility of electrical failure. Warm water can be pumped through the suit using an umbilical system, but this solution limits the diver's freedom of movement. Another approach involves combining an inflexible, relatively incompressible insulating material such as glass microspheres or cork with a flexible elastomeric binder. See French Pat. No. 1,371,285 (Chabanier), delivery date July 27, 1964 and U.S. Pat. No. 3,404,406 (Balliet), issued Oct. 8, 1968. A difficulty with this approach is that the diving suit must contain a very large number of individual core sections laminated with outer "skins" to permit free movement of the diver's limbs. See the aforementioned Balliet Patent. This vast multitude of very small individual sections (each section measures only a few centimeters on a side) increases the overall heat loss of the suit due to a negligible insulating effect around the perimeter of each section. Even when ordinarily soft, pliable elastomeric binders are filled with tiny (less than 300 microns in diameter) glass microbubbles the microbubble fillers severly stiffen the binder/filler combination, thus necessitating the aforementioned requirement for a multisectioned core material.

Accordingly, this invention contemplates an insulating material suitable for using in diving suits the insulating properties of which are primarily derived from hollow microspheres fully embedded in a binder or matrix material, wherein the resulting combination of binder or matrix and hollow microspheres is as flexible as an unfilled elastomer but has many times the insulating effect at great depths and is more compression resistant than rubber foams.

This invention also contemplates diving suits made from this highly flexible, highly insulative microsphere-containing material.

Briefly, this invention provides microbubble-filled insulative and diving suit materials with unusual flexibility. Preferably, the binder or matrix for the microbubbles is a material having an extremely low tensile stress at substantial elongations but nevertheless can be considered an "elastomer." The American Society for Testing and Materials (ASTM) defines an elastomer as a "material which at room temperature can be stretched repeatedly to at least twice its original length and upon immediate release of the stress will return with force to its approximate original length." Suitable nonelastomeric binder or matrix materials are amorphous and thixotropic; they are less preferred, since they are very difficult to use in conventional diving suit fabrication procedures. They have a measurable shear modulus but exert virtually no tensile stress when elongated. When filled with microbubbles, they also provide the insulative properties of this invention without unduly sacrificing flexibility. To sum up, it is a characteristic of all the embodiments of this invention that an insulating material is provided which material comprises a binder or matrix having an extremely low tensile stress at substantial elongations and having microbubbles (hollow microspheres) fully embedded therein. By "extremely low tensile stress" is meant a stress of less than 10 p.s.i. (0.7 kg/cm$^2$) measured at 200 percent elongation of a sample having a cross section of 1 sq. in. (6.45 cm$^2$). For convenience, stress at 200 percent elongation will hereinafter be referred to as the "rubber modulus." ("Cross section" is initial cross section.)

In a preferred embodiment of the invention, the hollow microspheres are hollow glass microbubbles having diameters of 20 microns to 400 microns, and an average true particle density of 0.08 to 0.40 grams/cc. The microbubbles should have a resistance to hydrostatic crushing such that less than 10 percent by volume of the bubbles collapse at a pressure of 200 p.s.i. The preferred microbubbles of this type comprise at least 40% SiO$_2$ and are made by expanding solid glass particles at temperatures in excess of 1,000° C. See U.S. Pat. No. 3,365,315 (Beck et al.,) issued Jan. 23, 1968. The hollow microspheres should comprise less than 60 or 65 percent by volume of the insulation material, and preferably about 20–55 volume per cent. When a binder or matrix material of this invention contains a microbubble loading of greater than 65 volume per cent, microbubble-to-microbubble contact within the resulting filled binder or matrix (i.e., the insulating material) becomes so excessive that large amounts of microbubbles will be fractured during flexing of the insulating material. Such fracturing of microbubbles substantially reduces the insulative value of the insulating material. It is an essential feature of this invention that contact between microbubbles in the matrix be kept to a minimum. Furthermore, loadings higher than 65 volume per cent or even 60 volume per cent tend to result in unacceptably stiff insulating materials. Loadings substantially below 20 volume per cent (e.g., 5 or 10 volume per cent) do not significantly increase the insulative value of the insulating material insofar as deep dives or high ambient pressures are concerned, e.g., dives below about 100 feet (about 30 meters) or ambient pressures in excess of about three atmospheres.

The preferred binder material is an elastomer, preferably a solid, oil-extended block copolymer which comprises at least about 70 percent by weight of the oil and which, tested free of the microsphere filler, has the above-described 200 percent "rubber modulus" value of less than 10 p.s.i. The corresponding 100 percent "rubber modulus" (same original cross sectional area) value is less than about 7 p.s.i. (0.5 kg/cm$^2$) and generally less than 5 p.s.i. (0.35 kg/cm$^2$).

The oil-extended block copolymer is self-supporting in the form of thick sheets and can be used thus, but it is preferred that a thin skin of polymeric film or sheet of fabric covers the oil-extended copolymer on one or both sides. Such a skin provides wear resistance and support to the insulation material. The skins also minimize bleeding of oily material from within the insulation and oxidative degradation of the material due to contact with the atmosphere. By "bleeding" is meant migration of the oil to the surface of the oil-extended copolymer or into or onto adjacent materials or laminae. The "rubber modulus" of the oil-extended block copolymer should be as low as possible, but it is necessary for efficient industrial practice that this oil-extended material be resistant to cold flow and "bleeding" and be an "elastomer" as defined by ASTM. Generally speaking, as the oil content increases, the "rubber modulus" decreases, but so does the resistance to "bleeding." So long as the oil-extended block copolymer is still "elastomeric," the "bleeding" problem is more manageable and resistance to cold flow can be good. An oil content of 95 weight per cent or less insures that the oil-extended block copolymer will be elastomeric. At an oil content of 95 to about 97 weight percent, some marginal elastomeric properties are observed. At the aforementioned 95 weight percent oil content, a sample with a 1.0 square inch (6.45 cm$^2$) original cross section exerts a stress of less than 1.0 p.s.i. (0.07 kg/cm$^2$) at 100 percent elongation — generally speaking this stress measurement will be on the order of about 0.5 p.s.i. (0.035 kg/cm$^2$).

In a further embodiment of the invention, insulative materials for deep submergence diving suits are prepared from the hollow microspheres and a thixotropic binder or matrix material such as a thixotropic grease or an oil containing a thixotropic agent such as clay, amine-modified clay, asbestos, or silica. Diving suits can be made by enclosing the thixotropic-material/microbubble mixture within individual packets of polymeric film. The film is preferably formed from a tough elastomer or from a polymer-coated fabric, preferably a material which is unaffected by the thixotropic material.

The invention will be further explained with reference to the accompanying drawings wherein:

FIG. 1 is a perspective view of a diving suit according to the invention with parts broken away to show construction of the suit.

FIG. 2 is a perspective view showing a method for joining two pieces of the insulation material; and FIG. 3 is a perspective view with an end in cross section showing insulation material in accordance with a further embodiment of the invention.

Referring more particularly to the drawings, there is seen in FIG. 1 a diving suit comprising a limb and torso-enclosing garment 10 with frontal section 10' broken away to reveal the basic construction of the suit. A layer of flexible insulating material 12 in accordance with the invention forms the bulk of the suit. Flexible elastomeric skins 14 and 16 are bonded to opposite sides of insulating layer 12. A flexible elastomeric tape 18, preferably an adhesive tape, is bonded over the joints in the material. A similar tape 20 is preferably also used to cover the ends of the tubular suit portion.

At FIG. 2 is shown a simple method for uniting pieces of the insulating material. A hot knife or blade 22 is simply passed between the two pieces of insulating material in the direction shown by arrow 24. The material is at the same time squeezed to contact as illustrated by arrows 26 and 28. Knife 22 is at a temperature sufficiently high to cause fusion of the insulating layer 12. The two pieces are squeezed together while the material 12 is in a fused state and are then allowed to coalesce while in tight contact. The joints thus formed are almost as strong as the remainder of the material. It is preferred to cover the joints with a tape, as illustrated by tape 18 in FIG. 1.

In the embodiment of FIG. 3 insulating layer 30 is formed from separated compartments or packets 32. Each packet contains an amorphous, thixotropic, material 34 which contains microbubbles. A layer of elastomeric film or fabric 36 may cover one or both surfaces of the insulating layer.

As noted above, the matrix material can be a thixotropic amorphous material such as a grease or other fluid material such as a heavy oil containing a thixotropy producing additive such as finely divided silica or clay, which is contained within individual packets or in a quilted suit. Such materials exert little or no tensile stress upon elongation, have a high resistance to shear at very low shear forces, and a low resistance to shear at higher rates. Thus, easy flexing of the material is permitted because of the high shear rates involved in flexing, but the microspheres or microbubbles do not separate from the matrix material due to density differences, since the very low shear rates are involved in such separation of the bubbles. Furthermore, the thixotropic matrix material prevents any substantial microsphere-to-microsphere contact, thus preserving the insulative properties even after repeated flexing.

As noted previously, in the preferred embodiment, the matrix used for the insulating material comprises a block copolymer extended with an oil. The preferred block copolymers are of the A–B–A type disclosed, for example, in U.S. Pat. No. 3,265,765 (Holden et al.,) issued Aug. 9, 1966. In these block copolymers each A is a non-elastomeric polymer block having an average molecular weight of 2,000 to 100,000, and a glass transition temperature above 25° C., and B is an elastomeric polymer block having an average molecular weight between about 15,000 and 1,000,000 (preferably 15,000 to 250,000), and a glass transition temperature below about 10° C. When the block copolymers are oil-extended, they form a gel in which the oil is somehow trapped in the mass of the copolymer. Flexible, self-supporting sheets of gel material can be formed using about 5 to 30 percent by weight of block polymer with about 70 to 95 percent by weight of oil, preferably a hydrocarbon oil. Below about 5 percent block copolymer it is necessary to contain the material in packets as shown in FIG. 3 to minimize "bleeding." Above about 30 percent block copolymer the material becomes too stiff when filled with microbubbles to be useful for the main portions of a diving suit. Sheets of such material form suits too stiff to permit easy muscular movement. Soles of boots, however, for example, could be formed from such stiffer materials. For ease of manufacture (casting, etc,) and good elastomeric properties (including the previously described range of "rubber modulus"), the preferred block copolymer content is 10 to 20 weight percent. In this range, the previously described 100 percent elongation tensile stress measurement is about 1 to about 3 p.s.i. (0.07 – 0.2 kg/cm$^2$). It is preferred to cover the surfaces of the insulating material with an elastomeric or fabric skin in order to provide additional support, wear and abrasion resistance, protection from oxidation, cold flow resistance, protection from tackiness and/or bleeding of oil at the surfaces of the material, and simplifying of diving suit fabrication procedures. The use of a fabric cover on one side of the material is particularly advantageous where it is desired to use sewn seams in the material as are preferred when the material is formed into boots or similar articles. In forming such articles it is found that the fabric provides a tough abrasion, tear and puncture-resistant outer surface. It is preferred to use an elastic film to line the inner surface of curved articles in order to minimize wrinkle formation in the compressed inner surface.

One of the advantages of the oil-extended block copolymer gel materials is that they can be melted at temperatures in the range of 300° to 400° F. (150°–205° C.) and thus can be cast into pieces of any shape or thickness. This provides a particular advantage where it is desired to form articles having odd or intricate shapes, such as shoe soles, insoles for boots, cold weather shoes, ski boot liners, helmets, helmet liners, and other applications in which it is desirable to hot cast a low density, compression-resistant material which has considerable flexibility.

The preferred method of forming the gel involves heating the oil, usually to a temperature near 350° F. (175° C.), and mixing in the desired amount of block copolymer until it is completely dissolved in the oil. Some block copolymers are relatively difficult to dissolve by this simple technique, and in the case of such polymers it is preferred to first dissolve the block copolymer in a good solvent such as toluol, and add this solution to the desired amount of mineral oil, and raise the temperature with mixing and evacuation to boil off the volatile solvent. The resulting solution of block copolymer in oil formed by either of these methods is of a pourable, castable viscosity. Upon cooling of the solution, a soft highly elastic gel is formed. In forming the preferred insulation material of this invention, it is desirable to mix the microbubbles in the hot elastomer-oil solution in the desired proportions. Adding the bubbles at this point permits easy mixing in thereof, thus minimizing breakage of bubbles, and also facilitates the removal of air from the mixture.

It will be apparent to those skilled in the art that various elastomeric binder or matrix materials can be filled with microspheres and used as insulative or diving suit materials of this invention, provided that these binder materials meet the criteria described herein. One well recognized measurement, the "rubber modulus" described previously provides an adequate basis for screening elastomeric polymers (including homopolymers, copolymers, etc.) for use as binder materials of this invention. This modulus criterion rules out conventional polymeric binders such as those described in the aforementioned Balliet patent. Binder materials which meet the modulus criterion either are non-elastomeric (the thixotropic materials described previously) or are characterized by an extremely low "rubber modulus," i.e., the previously described oil-extended block copolymers. Other polymers or copolymers which meet the modulus criterion of this invention are those which can be of relatively low molecular weight and/or can be oil-extended to a great extent without becoming a semi-liquid, pourable amorphous mass.

"Rubber modulus" or tensile stress measurements do not, however, provide an a accurate index of performance (i.e., flexibility) in use as a diving suit material), particularly for filled and/or composite (laminated) materials. The property of "flexibility" is easy to perceive subjectively when wearing a diving suit but difficult to correlate with any commonly used quantitative physical measurement. Furthermore, elongation or flexing of an unsuitable or inoperative filled material can fracture the hollow filler, thus giving the appearance of flexibility and elasticity, while in fact the insulative value of the filled material is being drastically degraded with each movement of the diver's body.

It has been found that the use of a newly developed mechanical device technically known as a rolamite (see "Rolamite, A New Mechanical Design Concept" by D. F. Wilkes, Research Report SC-RR-67-656A, December 1967, of Sandia Laboratories, Albuquerque, New Mexico, U.S.A.), in conjunction with a standard tensile testing machine will provide a reliable quantitative indication of the "flexibility" and freedom of movement observed when wearing a conventional foam rubber diving suit. The rolamite/tensile machine test method will be described subsequently.

Insulating material formed from the oil-extended block copolymer gel without adding microbubbles has inferior insulative properties as compared to a gel filled with at least 20 volume per cent of microbubbles. Even when at least 20 volume per cent of the microbubbles are added to the gel, the resulting insulative material may provide slightly less insulating effect, at one to two atmospheres ambient pressure (dives to as low as 10 meters), than conventional foamed neoprene (polychloroprene) diving suit material. However, as the ambient pressure increases beyond two atmospheres or the dive descends below 10 meters, the superior insulative properties of diving suits made according to this invention become increasingly evident. Surprisingly, these superior insulative properties remain remarkably constant at ambient pressures up to 20 or even 30 atmospheres, i.e., in dives of up to 180 or even 300 meters.

These superior insulative properties are believed to be attributable to the gas or gases entrapped within the hollow microbubbles. Thus thin insulation materials can be used to provide adequate insulation for deep dives; generally speaking, the thickness, with or without skins, of insulative materials of this invention can be comparable to the thickness of conventional foam rubber diving suit materials, i.e., about 1.5–13 mm. preferably 5–10 mm. It is preferred that the matrix of the insulation material have a low thermal conductivity in its own right. Toward this end, it is best to omit carbon black and crystaline mineral fillers, since these tend to increase the thermal conductivity.

Although the preferred microbubbles, i.e., tiny hollow microspheres, are those described in the aforementioned U.S. Pat. No. 3,365,315 (Beck et al., it is possible to use microbubbles formed from compression-resistant polymers such as phenolic resins, epoxy resins, and the like, or inorganic material such as alkali metal silicates. These resinous or alkali metal silicate microbubbles are less preferred due to their relatively low (compared to the Beck et al., microbubbles) resistance to crushing and/or resistance to oils and solvents employed in forming the preferred insulation material.

While the preferred method of forming diving suits and similar protective clothing from the insulation materials of this invention is by a hot casting procedure, the materials of this invention can also be shaped by other techniques. For example, a suit or other article can be formed by hot spraying of the molten material onto a mannequin or form. The mannequin or form can first be covered with a layer of fabric or elastomer which forms the inner surface of the article being formed.

The aforementioned rolamite/tensile machine test will now be described. This test is highly sensitive to a property of a film or sheet-like material which can be called "flexibility," "flex ease," or "drape." This property is probably determined by or related to a complex combination of mechanical properties or measurements, including modulus, thickness, density and compressibility, and is strongly affected by the presence or absence of fillers and/or additional layers laminated to the material.

A rolamite is a device comprising two adjacent, cylindrical, smooth-surfaced rollers disposed within a frame having a rectangular cross section, the longitudinal axes of the rollers being oriented perpendicularly to the rectangular cross section of the frame, one of the rollers being slightly closer to an end of the frame than the other. A "band" or rectangular strip of flexible, sheet-like material is anchored to one end (hereinafter the "first end") of the frame. The width of the "band" is oriented parallel to the longitudinal axes of the rollers and its length runs parallel to the longest dimension of the frame and alongside one of the long sides of the frame. The free end of the "band" is passed around the rollers in a backward S-configuration, and run alongside the other long side of the frame to the opposite end, where it too is anchored. An axle in the roller furthest from the first end of the frame is mounted in a substantially frictionless bearing and contains a pin which can be attached to the fixed (nonmoving) sample grip of a "constant rate of extension" type of tensile tester device. For a description of this type of tensile tester, see *The Science and Technology of Polymer Films*, Volume I, O. J. Sweeting, Ed., Interscience Pub., N.Y., 1968, pp. 553–554. A particularly suitable tensile tester of this type is known by the trade designation "Instron." The powered (movable) sample grip or jaw of the tensile tester is attached to the first end of the rolamite frame. When the tensile tester is operated, the "band" is flexed by the two rollers, which rotate in opposite directions and move toward the opposite end of the frame. The rolamite substantially eliminates surface friction, and the force measured by the tensile tester (conveniently expressed in grams) is only that which overcomes internal friction (resistance to flexing). This force measurement will accurately reflect differences in the thickness and composition of the band. Filled or unfilled, laminated or monolayer sheets can thus be used as bands, and in every case a reproducible and meaningful measurement of flex ease will be obtained, the experimental error in duplication of results being within 5 percent. For a given material, the rolamite/tensile machine test should be run on several samples of the material, each sample being pulled through several times to determine if changes in the composition of the band (such as fracture of hollow fillers) are occurring during flexing. Duplication of rolamite readings within 5 percent indicates that few, if any, changes are occurring. To further standardize the rolamite/tensile tester "flex ease" values, the "band" is threaded through rolamite rolls 2.54 cm in diameter, and these rolls are pulled through the rolamite at a pull rate of 25.4 cm/min.

A conventional insulative material for wet suits is neoprene (polychloroprene) foam 0.25 in. (6.35 mm) in thickness. If not laminated to an unduly stiff supporting material such as elastomer-impregnated fabric, 0.25 in. neoprene foam has a "- flex ease" value, as defined by the previously described test, of 70 grams. Insulative materials of comparable thickness (e.g., 0.25 – 0.375 in.) can be made according to this invention with a comparable "flex ease" value, e.g., 60–120 grams. To measure the "flex ease" value of the oil-extended block copolymer microbubble-filled matrix materials of this invention, it is desirable to laminate the major surfaces of the filled matrix to thin skins, thus providing ease of handling and testing. It has been found that 1 mil (0.0254 mm) polyester urethane elastomer skins do not significantly affect the "flex ease" value of the filled matrix per se; i.e., the "flex ease" of such a laminate is, within the limits of experimental error, the same as that of the filled matrix. To measure the "flex ease" of an amorphous, thixotropic microbubble-filled matrix, the filled matrix is fully covered and contained within a packeted construction similar to FIG. 2 of the drawing.

Insulative materials have been found to be suitable for use in diving suits if the "flex ease" value is less than 300 g., preferably less than 120 g. Insulative materials with this amount of "flex ease," when laminated to elastomerimpregnated fabric and other stiff supporting materials, are stiffened up to a "flex ease" value of up to about 1,000 grams. So long as the "flex ease" value is below 500 g., this stiffening is not too detrimental. A diving suit made from material in the 500 – 1,000 g. range is still flexible enough to permit some movement of limbs — but with difficulty. Above this 500 – 1,000 g. range, complex suit constructions with relatively poor insulative value are necessary for free movement of limbs.

A 1.0 in.$^2$ (6.45 cm$^2$) original cross section sample of a filled matrix material of this invention which has the above-described "flex ease" values is found to exert a tensile stress of less than 20 p.s.i. (1.4 kg/cm$^2$), generally 2 – 15 p.s.i. (0.14 – 1.05 kg/cm$^2$), at 100 percent elongation, a measurement similar to or lower than unlaminated 6.4 mm neoprene foam. The seamed construction of FIG. 1 of the Drawing or the packet construction of FIG. 3 both provide excellent flex ease and freedom of movement. Individual packets (as in FIG. 3) can provide ease of fabrication but are not needed for flex ease in suits of this invention. In fact, packet constructions wherein the packets are relatively large (for example, 10 × 20 cm.) provide as much freedom of movement for the diver as packets which are less than 5 cm. long.

The term "thixotropic," as used in this application, relates to a determination that a given material has shear-dependent viscosity under normal ambient conditions.

The invention will be further illustrated by the following examples wherein all parts are by weight unless otherwise indicated.

EXAMPLE I

A 33 percent solution of a styrene-butadiene-styrene block copolymer having one polymer block of 70,000 molecular weight polybutadiene and two polymer blocks of 15,000 molecular weight polystyrene (available from Shell Chemical Co. under the trade name "Kraton 101") in toluol (i.e., toluene) was cast onto release paper with a 12 mil (0.305 mm) bar setting and allowed to dry. A piece of the resulting film was laid in a ¾ inch (1.91 cm.) thick plywood frame with ½ inch (1.27 cm.) deep edges. Then 420 parts mineral oil, USP, and 180 parts 33 percent "Kraton 101" in toluol were mixed together and heated to boil off the toluol. Heating was continued as vacuum was applied to remove all traces of solvent and raise the temperature to 350° F. (177° C.), and 87 g. glass microbubbles having a density of 0.21 g/ml. and average diameters of 80 microns were added with careful mixing and further evacuation. The mixture was cast onto the "Kraton" film in the frame so as to give a thickness of about 0.40 inches (1.02 cm.) and, while still hot, a piece of two-way stretch nylon tricot fabric was applied to the still fluid surface. The laminate was allowed to cool to give a flexible, elastic insulation material suitable for forming a diving suit.

Rates of heat loss through the material at atmospheric and elevated pressures were compared with that of conventional neoprene foam as follows: A one pint (0.473 liter) blown polyethylene container having a flat cylindrical shape was covered front and back with sheets of test insulation held in place by ring-shaped clamps which sealed the periphery of the sheets together completely around the container; 400 g. of water at about 45°–50° C. were weighed into the container, and a thermometer was sealed into the opening by means of the clamps. The assembly was immersed in agitated ice water and the temperature of the water in the container was read every 2 minutes. Measurements were taken at atmospheric pressure and under a pressure of 300 p.s.i. (20.4 atm), the latter measurements being made by placing the entire assembly in a pressurized vessel. Cooling curves were obtained by plotting temperatures versus time. Tangents to the curves were drawn at the points where the curves crossed 37° C. (body temperature). The slope of the tangent, which is the instantaneous rate of heat loss for the particular sample under a temperature difference of 37° C. ($\Delta T/\Delta t$) was obtained and is recorded in Table I.

TABLE I

| Insulation material | $\Delta T/\Delta t$ | |
| --- | --- | --- |
| | Atmospheric pressure | 300 p.s.i. (20.4 atm.) |
| ¼ inch (6.35 mm.) thick neoprene foam. | 0.43° C./min | 2.62° C./min. |
| 7/16 inch (11.11 mm.) thick specimen of this example. | 0.41° C./min | 0.50° C./min. |

The data shows that while the rate of heat loss through the specimens was approximately the same at atmospheric pressure, the specimen of this example was much more resistant to increases in thermal conductivity under increasing pressure than was the conventional neoprene foam diving suit insulation material. The volume of the material of this example was measured at atmospheric pressure and again at 300 p.s.i. (20.4 atmospheres). A loss in volume of only 2.13 percent was found to occur with this increase in pressure.

EXAMPLE II

A film is prepared by mixing together 100 parts "Kraton 101" (described in Example II), three parts pigment grade carbon black, and 200 g. toluene. This mixture is milled two passes on a three roll paint mill to disperse the carbon black. 30 parts USP mineral oil ("Drakol 35") is added to the mixture which is then coated onto a silicone release paper using a doctor blade with an orifice set at 20 mils (0.508 mm.). This film is dried by passing it through an oven. A bubble-gel mixture is prepared by heating 34 parts by weight mineral oil with six parts by weight "Kraton 107" (trade name), a block copolymer of styrene-isoprene-styrene, available from the Shell Chemical Co. This mixture is heated and stirred with vacuum applied, until the "Kraton" is totally dissolved in the mineral oil and the temperature raised to approximately 350° F. (about 177° C.). At this point 7.62 parts by weight hollow glass microspheres having a density of 0.21 grams per milliliter and having an average diameter of approximately 80 microns are added. Further evacuation and mixing are continued to remove any entrained air. This mixture is cast hot onto the surface of the "Kraton" film previously described. A similar film having fabric laminated thereto is applied to the top surface while the mixture is still hot. When cooled, the release paper is removed from the Kraton film skin on each side of the slab of insulation. Pieces of the insulation are cut to size and welded together by the hot welding technique shown in FIG. 2 to form a diving suit. The fabric is used to form the outer surface of garments. Suturing or sewing of the fabric is also done to reinforce the seam thus formed.

EXAMPLE III

A matrix forming material was prepared as follows: 90 parts of mineral oil (U.S.P.) were charged to a kettle and heated to 182° C. The hot kettle of mineral oil was purged of air with nitrogen gas. The block copolymer composition which was then charged to the hot kettle was as follows:

| Parts (wt.) | |
|---|---|
| 25 | 20 wt. % solids solution of polystyrene-polyisoprene-polystyrene (available from Shell Oil Co. under the trade name "Kraton 1107") in "toluol" (toluene). |
| 25 | 20 wt. % solids solution of polystyrene-polybutadiene-polystyrene (available from Shell Oil Co. under the trade name "Kraton 1108") in "toluol" (toluene). |

The resulting matrix-forming mixture (90 parts oil, five parts styrene-isoprene-styrene block copolymer, and five parts styrene-butadiene-styrene block copolymer) was stirred and a vacuum was applied to the kettle to draw off the toluene solvent; during the solvent removal, the temperature of the kettle contents was maintained at 182° C. An antioxidant, e.g., "Ionox 330" (trade mark), can also be added to the kettle in the amount of 0.2 part to insure against degradation of the oil and copolymers. Glass microbubbles (see Beck et al., U.S. Pat. No. 3,365,315) having a density of 0.21 g/ml and average diameters of 80 microns were then added to the kettle in sufficient quantity to provide 35 volume per cent microbubbles based on the total volume of oil-extended "Kraton"; during the microbubble addition the temperature of the kettle contents was maintained at 179°–180° C. Vacuum was again applied to the kettle to remove trapped air introduced during the microbubble addition step. The temperature of the kettle contents was raised to 185° C. just prior to melt casting, the melt casting step being carried out as in the preceding examples. The substrate film for the melt casting procedure was 1 mil (0.0254 mm.) thick and was prepared by casting and drying on release paper, as described in the preceding examples, the following composition:

| | Parts |
|---|---|
| Polyesterurethane derived from poly(1,4-butylene adipate)glycol, 1,4-butane diol, and diphenylmethane-p,p'-diisocyanate in the molar ratio 1.00:1.85:2.85 (available from B. F. Goodrich under the trade name "Estane 5701") | 10 |
| Polystyrene-polybutadiene-polystyrene block copolymer | 10 |
| Tetrahydrofuran | 80 |

(Although it is not necessary to the practice of this example, blue or black pigment can be added to the film-forming composition. So long as pigment is present only in the film, and not in the matrix composition, the thermal conductivity of the film-matrix composite is not adversely affected.) For ease of fabricating a diving suit, the polyesterurethane/block copolymer film can be provided with a mineral oil-insensitive adhesive layer on the side of the film which is in contact with the release paper. This adhesive (e.g., a tackified block copolymer dissolved in 1,1,1-trichloroethane and diluted to 20 weight percent solids with xylene) facilitates attachment of slabs of insulating material to preformed wet suits, thus improving the insulating characteristics of such suits, as will be described subsequently. The laminate of microbubble-filled matrix and polyesterurethane/block copolymer film was permitted to cool and a second 1 mil (0.0254 mm) film, also made according to this example, was laminated (by passing through cold rolls) to the opposite side of the microbubble-filled matrix to form a skin/core/skin laminate having a 6.75 mm overall thickness and a "flex ease" (defined herein) of 67 g. A diving suit was then fabricated as follows: A conventional wet suit was formed on a mannequin using neoprene foam of 2.5 mm thickness bonded to the usual fabric (nylon tricot). Slabs, 10 × 20 cm in size, of insulation material made according to this example were adhered to the preformed wet suit to provide a deep submergence diving suit useful in dives to 180 meters or deeper. A fabric or elastomeric covering layer can be added to this deep submergence suit for better overall integrity.

An advantage of the insulation material and the suit of this example is a very high resistance to "cold flow" or distortion due to stresses applied at ambient temperatures as high as 85° C. Since a diving suit, even on a sunlit ship deck in hot weather, rarely becomes heated to temperatures much above 50° or 55° C., suits made according to this example have advantages in terms of handling and storage. These advantages are surprising in view of the extremely low "rubber modulus" and high oil content of the matrix material.

The skilled technician will readily perceive how the teachings of the preceding examples and FIG. 3 of the drawing can be applied to make insulative materials out of amorphous thixotropic materials filled with microbubbles on a hand-crafted basis (commercial scale operations are not practical with amorphous materials). Examples of such thixotropic materials include >97 (weight) percent oil-extended block copolymers, lubricating greases of the "multi-grade" type which contain thixotropy-producing additives, oils and waxes containing thixotropic agents, etc.

When comparing the insulative effect of diving suit or insulative material made according to the preceding Examples with the matrix material (oil-extended block copolymer) per se, an improvement of at least about 30 percent is noted. The materials made according to the examples also have a significantly lower apparent density than the unfilled matrix materials.

What is claimed is:

1. A diving suit, said suit having torso and limb-enclosing portions comprising a filled matrix material and a flexible supporting means therefor, said filled matrix material comprising:
   1. as a matrix material,
      an oil-extended block copolymer composition, said composition being elastomeric and exerting a tensile stress at 100 percent elongation of less than 7 p.s.i., said tensile stress having been determined on a sample of said composition which is free of fillers and has a 1.0 in.$^2$ original cross section, and
   2. as a filler for said matrix material, microbubbles having a numerical average diameter ranging from about 20 to about 400 microns and a true particle density ranging from about 0.08 to about 0.4 g/cc, said microbubbles being distributed throughout and fully embedded in said matrix material, said filled matrix material containing at least about 20 percent by volume of said microbubbles and having a rolamite/tensile tester flex ease value of less than 300 grams.

2. A diving suit according to claim 1 wherein said filled matrix is in the form of a sheet, and said flexible supporting means is a layer in contact with at least one side of said sheet.

3. A diving suit according to claim 1 wherein said rolamite/tensile tester flex ease value is less than 120 grams.

4. A diving suit according to claim 1 wherein said tensile stress at 100 percent elongation is less than 5 p.s.i.

5. A diving suit according to claim 1 wherein said microbubbles have, when fully embedded in said matrix material, a resistance to hydrostatic crushing such that less than 10 percent by volume of said microbubbles collapse at a pressure of 200 p.s.i.

6. A diving suit according to claim 1 wherein said oil-extended block copolymer composition comprises at least 70 percent by weight of a hydrocarbon oil and no more than 30 percent by weight of a block copolymer of the type

A – B – A wherein each A is a thermoplastic polymeric block having a glass transition temperature above room temperature and an average molecular weight between about 5,000 and about 125,000, and B is a block of a polymerized conjugated diene having an average molecular weight between about 15,000 and about 1,000,000.

7. A diving suit according to claim 6 wherein said block copolymer of said oil-extended block copolymer composition comprises a mixture of polystyrene-polyisoprene-polystyrene and polystyrene-polybutadiene-polystyrene.

8. A diving suit according to claim 7 wherein said oil-extended block copolymer consists of 90 weight percent oil, 5 weight percent polystyrene-polyisoprene-polystyrene, and 5 weight percent polystyrene-polybutadiene-polystyrene.

9. A diving suit according to claim 1 wherein said flexible supporting means comprises a polyurethane elastomer skin.

10. An insulative material comprising a filled matrix, said filled matrix comprising:
1. an oil-extended block copolymer matrix composition, said matrix composition comprising at least 70 percent by weight of a hydrocarbon oil and no more than 30 percent by weight of a block copolymer of the type $$A-B-A$$

wherein each A is a thermoplastic polymeric block having a glass transition temperature above room temperature and an average molecular weight between about 5,000 and about 125,000, and B is a block of a polymerized conjugated diene having an average molecular weight between about 15,000 and 1,000,000; and
2. as a filler for said matrix composition, microbubbles having a numerical average diameter ranging from about 20 microns to about 400 microns and an average true particle density between 0.08 and 0.4 grams per cc, said microbubbles being distributed throughout and fully embedded in said matrix composition in a quantity providing at least 20 but less than 65 volume percent of said filled matrix composition.

11. An insulative material according to claim 10 wherein said filled matrix composition contains less than 60 volume percent of said microbubbles and said microbubbles have, when fully embedded in said matrix material, a resistance to hydrostatic crushing such that less than 10 percent by volume of said hollow microspheres collapse at a pressure of 200 p.s.i.

12. An insulative material according to claim 10 wherein the block copolymer component of said oil-extended block copolymer matrix composition comprises a mixture of polystyrene-polyisoprene-polystyrene and polystyrene-polybutadiene-polystyrene.

13. An insulative material according to claim 10 wherein said filled matrix is in the form of a sheet, said sheet having flexible supporting material bonded to each side thereof.

14. An article comprising:
1. a filled matrix, said matrix comprising:
an oil-extended block copolymer composition, said composition being elastomeric and exerting a tensile stress at 100 percent elongation of less than 7 p.s.i., said tensile stress having been determined on a sample of said composition which is free of fillers and has a 1.0 in.² original cross section, the filler for said filled matrix being microbubbles having a numerical average diameter ranging from about 20 to about 400 microns and a true particle density ranging from about 0.08 to about 0.4 g/cc, said microbubbles being distributed throughout and fully embedded in said matrix, said filled matrix containing at least about 20 but less than 65 percent by volume of said microbubbles; and
2. a flexible protective surface layer substantially fully covering said filled matrix.

15. An article according to claim 14 wherein said filled matrix is in the form of a sheet, and wherein said flexible protective surface layer is bonded to each side of said sheet.

16. An article according to claim 14 wherein said oil-extended block copolymer composition comprises at least 70 percent by weight of a hydrocarbon oil and no more than 30 percent by weight of a block copolymer of the type $$A-B-A$$

wherein each A is a thermoplastic polymeric block having a glass transition temperature above room temperature and an average molecular weight between about 5,000 and about 125,000, and B is a block of a polymerized conjugated diene having an average molecular weight between about 15,000 and 1,000,000.

17. An article according to claim 16 wherein said block copolymer of said oil-extended block copolymer composition comprises a mixture of polystyrene-polyisoprene-polystyrene and polystyrene-polybutadiene-polystyrene.

18. An article according to claim 14 wherein said flexible protective surface layer comprises a polyurethane elastomer skin.

19. A dividing suit, said suit having torso and limb-enclosing portions comprising a filled matrix material and a flexible supporting means therefor, said filled matrix material comprising:
1. as a matrix material, a non-elastomeric, amorphous, thixotropic mass; wherein the thixotropic mass comprises an oil or a wax containing a thixotropy-producing additive, or a lubricating grease.
2. as a filler for said matrix material, microbubbles having a numerical average diameter ranging from about 20 to about 400 microns and a true particle density ranging from about 0.08 to about 0.4 g/cc, said microbubbles being distributed throughout and fully embedded in said matrix material, said filled matrix material containing at least about 20 percent by volume of said microbubbles and having a rolamite/tensile tester flex ease value of less than 300 grams.

20. An article comprising (1) a filled matrix, said matrix being a non-elastomeric, amorphous, thixotropic mass, wherein the thixotropic mass comprises an oil or a wax containing a thixotropy-producing additive, or a lubricating grease the filler for said filled matrix being microbubbles having a numerical average diameter ranging from about 20 to about 400 microns and a true particle density ranging from about 0.08 to about 0.4 g/cc, said microbubbles being distributed throughout and fully embedded in said matrix, said filled matrix containing at least about 20 but less than 65 percent by volume of said microbubbles; and (2) a flexible protective surface layer substantially fully covering said filled matrix.

* * * * *